（12）United States Patent
Kodama et al.

(10) Patent No.: US 10,786,873 B2
(45) Date of Patent: Sep. 29, 2020

(54) FILLET ARC WELDED JOINT AND METHOD FOR PRODUCING SAME

(71) Applicant: NIPPON STEEL & SUMITOMO METAL CORPORATION, Tokyo (JP)

(72) Inventors: Shinji Kodama, Tokyo (JP); Yujiro Tatsumi, Tokyo (JP); Shoko Oami, Tokyo (JP); Yasuaki Naito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 337 days.

(21) Appl. No.: 15/748,059

(22) PCT Filed: Jul. 28, 2016

(86) PCT No.: PCT/JP2016/072220
§ 371 (c)(1),
(2) Date: Jan. 26, 2018

(87) PCT Pub. No.: WO2017/018492
PCT Pub. Date: Feb. 2, 2017

(65) Prior Publication Data
US 2018/0207751 A1 Jul. 26, 2018

(30) Foreign Application Priority Data
Jul. 28, 2015 (JP) ................................. 2015-148634

(51) Int. Cl.
*B23K 26/354* (2014.01)
*C22C 38/50* (2006.01)
(Continued)

(52) U.S. Cl.
CPC .............. *B23K 26/354* (2015.10); *B23K 9/02* (2013.01); *B23K 9/025* (2013.01); *B23K 35/30* (2013.01);
(Continued)

(58) Field of Classification Search
CPC .. B23K 26/354; B23K 35/30; B23K 35/3053; B23K 9/02; B23K 35/3086; B23K 9/025;
(Continued)

(56) References Cited

U.S. PATENT DOCUMENTS 3,773,500 A * 11/1973 Kanazawa .............. C22C 38/04
420/87
2004/0031544 A1 * 2/2004 Hara ..................... C21D 8/0226
148/521
(Continued)

FOREIGN PATENT DOCUMENTS

JP 51-90946 A 8/1976
JP 59-110490 A 6/1984
(Continued)

OTHER PUBLICATIONS

Chinese Office Action and Search Report for corresponding Chinese Application No. 201680044108.8, dated Sep. 27, 2019, with a partial English translation.
(Continued)

*Primary Examiner* — Donnell A Long
(74) *Attorney, Agent, or Firm* — Birch, Stewart, Kolasch & Birch, LLP

(57) ABSTRACT

A fillet arc welded joint formed by fillet arc welding at least two metal members, comprising a remelted and solidified portion obtained by irradiating a laser at a weld toe portion of the fillet arc welding of at least one metal member and a region including a boundary of the heat affected zone caused by the fillet arc welding at the surface of that metal member, the remelted and solidified portion being a range from a surface of the metal member to a depth of ½ or less of the thickness of that metal member, an average effective crystal grain diameter of prior austenite at a heat affected zone from a boundary of the remelted and solidified portion at the surface of the metal member to a depth of 0.1 mm in the thickness direction of the metal member being 20 μm or less.

12 Claims, 7 Drawing Sheets

(51) Int. Cl.
B23K 9/02 (2006.01)
B23K 35/30 (2006.01)
B23K 9/025 (2006.01)
C22C 38/00 (2006.01)
C22C 38/02 (2006.01)
C22C 38/06 (2006.01)
C22C 38/42 (2006.01)
C22C 38/44 (2006.01)
C22C 38/46 (2006.01)
C22C 38/48 (2006.01)
C22C 38/58 (2006.01)
B23K 101/00 (2006.01)

(52) U.S. Cl.
CPC ...... B23K 35/3053 (2013.01); B23K 35/3086 (2013.01); C22C 38/002 (2013.01); C22C 38/02 (2013.01); C22C 38/06 (2013.01); C22C 38/42 (2013.01); C22C 38/44 (2013.01); C22C 38/46 (2013.01); C22C 38/48 (2013.01); C22C 38/50 (2013.01); C22C 38/58 (2013.01); B23K 2101/006 (2018.08); C22C 38/00 (2013.01)

(58) Field of Classification Search
CPC .. B23K 2101/006; B23K 26/60; C22C 38/58; C22C 38/48; C22C 38/46; C22C 38/44; C22C 38/42; C22C 38/06; C22C 38/02; C22C 38/002; C22C 38/50; C22C 38/00; C21D 10/005
See application file for complete search history.

(56) References Cited

U.S. PATENT DOCUMENTS

| 2004/0169022 | A1* | 9/2004 | Mega | B23K 26/206 219/121.64 |
| 2016/0273066 | A1* | 9/2016 | Sakakibara | B32B 15/013 |
| 2018/0057916 | A1* | 3/2018 | Obata | C21D 9/46 |
| 2018/0127856 | A1* | 5/2018 | Takashima | C22C 38/002 |
| 2019/0100818 | A1* | 4/2019 | Kim | C22C 38/04 |

FOREIGN PATENT DOCUMENTS

| JP | 7-118757 A | 5/1995 |
| JP | 10-193164 A | 7/1998 |
| JP | 2003-171731 A | 6/2003 |
| JP | 4477707 B2 | 6/2010 |
| JP | 2011-62718 A | 3/2011 |
| JP | 2014-4609 A | 1/2014 |
| JP | 2014004609 A * | 1/2014 |
| KR | 20090121822 A * | 11/2009 |

OTHER PUBLICATIONS

Zhang, "Welding Physico-Metallurgy," Tianjin University Press, Aug. 1991, pp. 129-131.

Indian Office Action dated Oct. 23, 2019, for corresponding Indian Application No. 201817004037, with English translation.

* cited by examiner

FILLET ARC WELDED JOINT AND METHOD FOR PRODUCING SAME

TECHNICAL FIELD

The present invention relates to a fillet arc welded joint and a method for producing the same, more particularly is suitable for production of a fillet arc welded joint of thin steel sheets such as automobile use steel sheets.

BACKGROUND ART

In the past, in the automotive field, improvement of the fuel efficiency by reducing the weight of car bodies for environmental conservation and improvement of collision safety have been sought. For this purpose, various attempts have been made up to now to use high strength steel sheets to reduce thicknesses and to optimize car body structures to reduce the weight of car bodies and improve collision safety.

Large fatigue strength is also sought from high strength steel sheets aiming at reducing the weight of car bodies. In particular, in suspension arms, subframes, and other undercarriage members, the fatigue strength of the welded part has become more important. Stress concentrates at the welded part and residual stress is present thereat, so even if the strength of the base material is increased, it is considered that the fatigue strength will not increase.

To deal with such an issue, PLTs 1 and 2 propose the arts of using a TIG arc heat source or plasma heat source to remelt the weld bead and straighten out the shape thereof to reduce the stress concentration. However, these arts require skill, so stable control of the bead shape is difficult. Further, if using a TIG arc heat source or plasma heat source to remelt the weld bead, with thin sheet members, the input heat becomes excessive, so there is the problem that the HAZ deteriorates in quality and the fatigue strength is lowered.

Further, PLT 3 discloses the art of using a laser heat source to heat a weld toe portion until a temperature of an extent where the weld metal does not melt so as to harden the weld metal side and reduce the strain concentration at only the weld metal. Further, PLT 4 discloses the art of using a laser heat source to heat a weld toe portion to a temperature of an extent where the steel sheets do not melt so as to reduce the residual stress. However, since the heating temperatures of PLTs 3 and 4 are temperatures of less than the melting points of the weld metal, and the hardening becomes insufficient, so there is the problem that a sufficient effect of improvement of the fatigue strength cannot be obtained for a thin sheet welded joint.

Further, the method for producing a lap fillet arc welded joint of thin steel sheets disclosed in PLT 5 is art taking note of the fact that a weld bead toe part on a lower sheet surface is a starting point of fatigue fracture and the fatigue strength of a welded joint changes depending on the hardness of the weld bead toe part. This method of production aims at raising the hardness of the weld bead toe part and improving the fatigue strength, and the method is characterized by projecting a location where the toe part of the lap fillet weld bead is to be formed, irradiating high energy at that location in advance by a TIG arc or other high energy firing means to form a melted and solidified part, then welding the melted and solidified part by lap fillet arc welding so that the toe part is superposed thereof. However, even if hardening a location corresponding to the toe part in advance by application of a high energy heat source, sometimes the toe part softens due to reheating at the time of lap fillet arc welding and sometimes a sufficient effect of improvement of the fatigue strength cannot be obtained.

Further, PLT 6 discloses remelting a weld bead and steel sheet centered at the toe part of the weld bead of the welded joint using plasma so as to form the vicinity of the toe part smoothly and suppress concentration of stress due to repetitive stress. However, the metal structure at the remelted and solidified portion and the vicinity thereof changes before and after remelting, so the fatigue characteristics are liable to be unable to be sufficiently improved.

FIG. 1 is an enlarged cross-sectional view of a part showing a position of formation of a crack at a conventional lap fillet welded joint using an upper sheet 1 and lower sheet 2. A weld bead 3 has tensile residual stress due to the stress concentration derived from a discontinuous shape or shrinkage of the weld metal, so, as shown in FIG. 1, the portion where the crack is formed becomes the weld toe portion 3*b* and almost all of the crack 4 is propagated through the HAZ 5. None of PLTs 1 to 5 intend suppression of the drop in fatigue strength due to the deterioration of the quality of the HAZ or suppression of the progression of a crack at the HAZ. A sufficient effect cannot be obtained for improving the fatigue strength of the arc welded joint using high strength steel sheets with a tensile strength of 780 MPa or more.

In general, the fatigue life of the welded joint is classified by the lifetime before formation of cracks, but the state of formation of a crack in a welded joint is judged by a penetrant test or the amount of change in a strain gauge value, so it is not possible to judge the exact timing of crack formation. Fatigue strength is evaluated by the lifetime including crack propagation. For this reason, by suppressing crack progression at the HAZ, it may be possible to improve the practical fatigue strength of a welded joint.

In particular, in the case of high strength steel sheets, if the tensile strength is high, the crack propagation speed at the HAZ increases and the fatigue strength of the weld toe portion tends to become lower, so it is believed the effect of improvement of fatigue strength due to the suppression of crack progression of the HAZ would become larger.

CITATION LIST

Patent Literature

PLT 1: Japanese Patent Publication No. 59-110490A
PLT 2: Japanese Patent Publication No. 51-90946A
PLT 3: Japanese Patent Publication No. 7-118757A
PLT 4: Japanese Patent Publication No. 10-193164A
PLT 5: Japanese Patent Publication No. 2011-62718A
PLT 6: Japanese Patent Publication No. 2014-4609A

SUMMARY OF INVENTION

Technical Problem

As explained above, the cause of the drop of fatigue strength of a weld zone of high strength steel sheets is believed to be the detrimental effect on the fatigue strength of the weld zone due to the deterioration of the quality of the HAZ caused by fillet arc welding. Therefore, the inventors applied a thermal cycle at the time of welding to steel sheets of a tensile strength of the 440 to 980 MPa class to compare and investigate the fatigue strength at the quality of the base material as is and the fatigue strength of the weld heat affected zone. Note that, the heat treatment conditions for reproducing the HAZ were made a peak temperature of 1200° C. and cooling rates at 1200° C. to 800° C., 800° C. to 500° C., and 500° C. to room temperature of 80° C./s, 50° C./s, and 10° C./s. Further, envisioning stress concentration at the weld zone, they provided notches giving the fatigue test pieces a stress concentration coefficient (Kt) of 3.

FIG. 2 shows the results of the fatigue tests. The fatigue tests were made axial force fatigue tests with a stress ratio (R)=0.1. The fatigue strengths (shown by ranges of stress) were found with 2,000,000 cycles as the upper limits of the numbers of repetitions. The fatigue strength of a base material increases in accordance with the increase in tensile strength of the base material, but the fatigue strength of a HAZ tends to fall starting from 590 to 780 MPa.

In this way, in high strength steel sheets, the fatigue strength of the HAZ falls more than the base material. In other words, it is believed that the region of the HAZ where the crack progresses can be narrowed and crack progression can be suppressed to thereby increase the fatigue strength of the weld zone.

That is, in the present invention, the object is to provide a fillet arc welded joint narrowed in the heat affected zone (HAZ) region in the direction of progression of a crack, that is, the thickness direction, suppressed in crack progression, and excellent in fatigue strength and a method for producing the same.

Solution to Problem

In the present invention, a laser beam is used to treat the toe part of fillet arc welding. As shown in FIG. 3, in the present invention, the weld toe portion and the region including the boundary of the heat affected zone caused by the fillet arc welding are remelted by a laser beam to locally quench it to make it hard (below, referred to as "local quenching by laser"). The inventors discovered that by the remelting using a laser, it becomes possible to suppress a crack from the fillet arc weld toe portion and possible to narrow the HAZ 6b at the melted boundary 6b of the remelted region (remelted and solidified portion) 6 forming the position for crack formation after treatment by the laser so as to suppress the progression of the crack 4 and significantly improve the fatigue strength of a weld zone.

The present invention was made based on the above discovery and has the gist the following:

The fillet arc welded joint of the present invention is a fillet arc welded joint formed by fillet arc welding at least two metal members, the fillet arc welded joint comprising comprising a remelted and solidified portion obtained by irradiating by a laser a region including a weld toe portion of the fillet arc welding of at least one metal member of the metal members and a boundary of a heat affected zone caused by the fillet arc welding at the surface of the one metal member,
the remelted and solidified portion being formed in a range from a surface of the one metal member to a depth of ½ or less of the thickness of the one metal member,
an average effective crystal grain diameter of prior austenite at a heat affected zone from a remelted and solidified boundary portion to a depth of 0.1 mm in a thickness direction of the one metal member being 20 μm or less, the remelted and solidified boundary portion being a boundary of the remelted and solidified portion at a surface of the one metal member.

Further, in another example of the fillet arc welded joint of the present invention, the remelted and solidified portion is a range from the surface of the metal member to a depth of ⅓ or less of the thickness of that metal member.

Further, in another example of the fillet arc welded joint of the present invention, the weld metal of the remelted and solidified portion may have a Ceq value defined by the following formula (1) of 0.3 or more:

$$Ceq=C+Mn/6+Si/24+Ni/40+Cr/5+Mo/4+V/14 \quad \text{formula (1)}$$

where, in formula (1), C, Mn, Si, Ni, Cr, Mo, and V represent the contents of the elements (mass %), respectively. In the case of an element not added, 0 is entered.

Further, in another example of the fillet arc welded joint of the present invention, a depth of the remelted and solidified portion in a thickness direction of the metal member may be ⅕ or more of the thickness of the metal member from the surface of the metal member, and a hardness of a boundary portion of the laser remelted and solidified portion and heat affected zone at a position of 0.1 mm below the steel sheet surface may be 1.2 times or more of the hardness of the base material of the metal member and a hardness of the metal member from the surface of the steel sheet in a direction vertically under the boundary portion to a depth of ¼ of the thickness of the metal member may be 1.1 times or less of the hardness of the base material of the metal member.

Further, in another example of the fillet arc welded joint of the present invention, the metal members may be steel sheets of a thickness of 4.5 mm or less.

Further, in another example of the fillet arc welded joint of the present invention, a remelted and solidified portion is formed at least at one location where a high stress estimated in advance is to be applied.

The method for producing a fillet arc welded joint of the present invention comprises fillet arc welding at least two metal members, remelting by laser a region including a weld toe portion of the fillet arc welding of at least one metal member and a boundary of the heat affected zone caused by the fillet arc welding of the surface of that metal member, and forming a remelted and solidified portion from the surface of the metal member down to a depth of ½ or less of the thickness of the metal member.

Further, in another example of the method for producing a fillet arc welded joint of the present invention, an average effective crystal grain diameter of prior austenite at the heat affected zone at a depth of 0.1 mm from the remelted and solidified boundary portion in a thickness direction of the one metal member may also be 20 μm or less.

Further, in another example of the method for producing a fillet arc welded joint of the present invention, the remelted region may also be a range from the surface of the one metal member down to a depth of ⅓ or less of the thickness of the one metal member.

Further, in another example of the method for producing a fillet arc welded joint of the present invention, the Ceq value, defined by the following formula (1), of the remelted metal member may be 0.3 or more.

$$Ceq=C+Mn/6+Si/24+Ni/40+Cr/5+Mo/4+V/14 \quad \text{formula (1)};$$

where, in formula (1), C, Mn, Si, Ni, Cr, Mo, and V represent the contents of the elements (mass %), respectively. In the case of elements not added, 0 is entered.

Further, in another example of the method for producing a fillet arc welded joint of the present invention, a depth of the remelted and solidified portion from the surface of the metal member may be ⅕ or more of the thickness of the metal member, and the laser may be irradiated so that a hardness at a boundary portion of a laser remelted and solidified portion at a position of 0.1 mm below the steel sheet surface in the thickness direction and the heat affected zone becomes 1.2 times or more of the hardness of a base material of the metal member and a hardness at ¼ depth of the thickness of the metal member from the steel sheet surface in a direction vertical down from the boundary portion becomes 1.1 times or less of the hardness of the base material of the metal member.

Further, in another example of the method for producing a fillet arc welded joint of the present invention, the metal members may be steel sheets with a thickness of 4.5 mm or less.

Further, in another example of the method for producing a fillet arc welded joint of the present invention, the method may further comprise remelting by laser at least one location where a high stress estimated in advance is to be applied.

Further, in another example of the method for producing a fillet arc welded joint of the present invention, the laser may have a ratio of laser output (kJ/sec) to speed of movement (m/min) of 45 to 80 (kJ/m).

Advantageous Effect of Invention

According to the present invention, it is possible to improve the fatigue strength of a weld toe portion of high strength steel with a tensile strength of 980 MPa and narrow a HAZ in the thickness direction. For this reason, it is possible to increase the fatigue strength of the arc welded joint of thin steel sheets such as automotive use steel sheets.

DESCRIPTION OF EMBODIMENTS

The present invention is art aiming at suppression of progression of cracks by narrowing the HAZ in the sheet thickness direction. The effect of improvement of the fatigue strength changes depending on the laser quenching conditions. Therefore, as a preliminary evaluation, the inventors investigated the relationship of the laser treatment conditions and the fatigue strength. The test materials were made thickness 2.3 mm 980 MPa class steel sheets, while for the arc welding material, a welding material for 780 MPa class steel use (JIS Z3312 G78A4UMN5C1M3T) was used. The conditions were made arc welding of pulse MAG welding, a shield gas of Ar+20% $CO_2$, the welding current of 190 A, an arc voltage of 24V, and a welding speed of 80 cm/min.

The laser treatment conditions for the laser quenching were made a laser output 3 kW, a speed of movement of 3 m/min, targeting of the toe part of fillet arc welding, and two levels of defocus of +10 mm defocus and +15 mm defocus.

Figure 1:
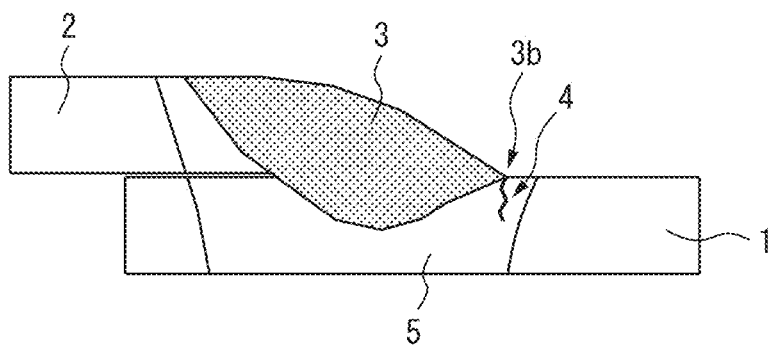
FIG. 1 is a partial enlarged cross-sectional view showing a position of crack formation in a conventional lap fillet welded joint.
Figure 2:
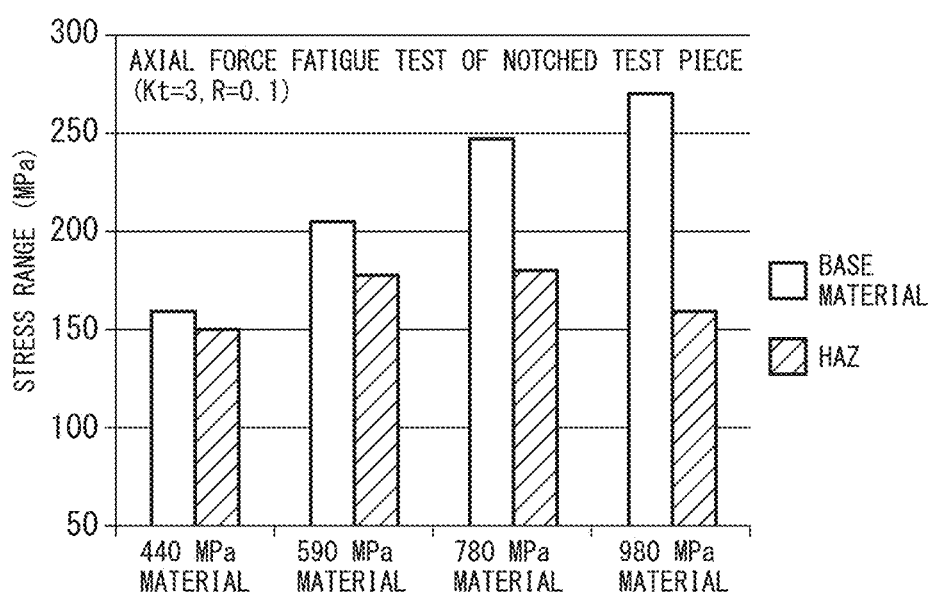
FIG. 2 is a graph comparing fatigue strengths of a base material and HAZ.
Figure 3:
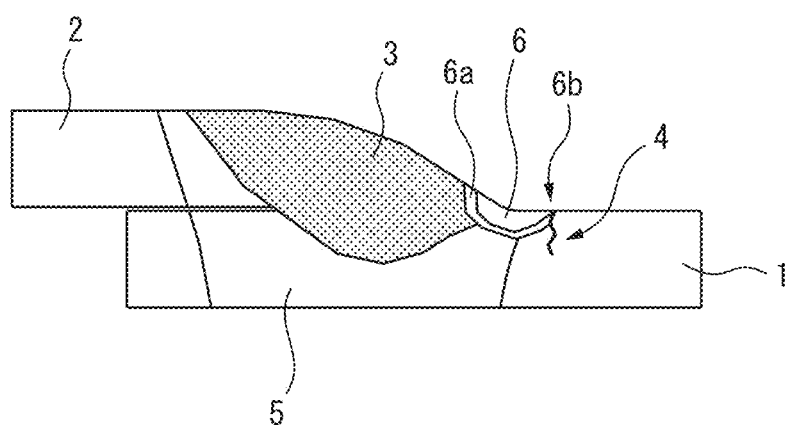
FIG. 3 is a partial enlarged cross-sectional view showing a position of crack formation in a welded joint treated by laser in the present invention.
Figure 4:
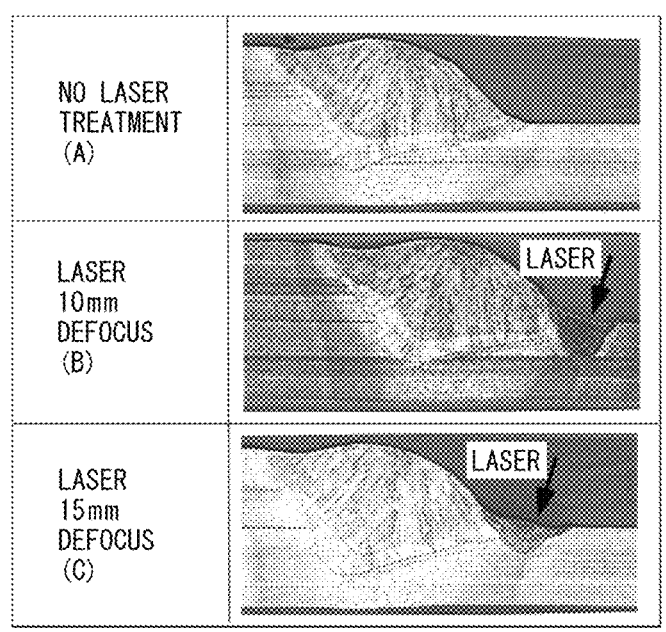
FIG. 4 is a view showing a cross-sectional melted shape of a weld zone for each of laser hardening conditions (A), (B), and (C).

FIG. 4 shows the cross-sectional melted shapes of weld zones in the cases of (A) no laser treatment, (B) quenching by +10 mm defocus, and (C) quenching by +15 mm defocus. The Vickers hardness at the melted boundary portion in the case of no laser quenching was 250 HV, but the hardness of that location by laser hardening rose to 382 HV. Furthermore, the remelted regions (regions of parts shown by arrows in FIGS. 4(B) and (C) corresponding to remelted and solidified portion 6 of FIG. 3) can be examined by cutting, polishing, and etching the samples.

Table 1 shows the fatigue lives of test pieces after local quenching. Furthermore, the fatigue lives of the test pieces were measured by performing pulsating tension bending tests with a stress amplitude of 250 MPa on the weld toe portions of the test pieces.

TABLE 1

| Condition | Laser treatment conditions | Fatigue test |
|---|---|---|
| A | No laser treatment | 110,000X |
| B | Laser (10 mm defocus) | 510,000X |
| C | Laser (15 mm defocus) | Over 2,000,000X |

As will be understood from Table 1, it will be understood that under the Conditions B and C at which local quenching is performed by laser, compared with the case of just welding, the fatigue life is improved about 5 times to 20 times or so. By melting the weld toe portion by laser in this way, that toe part is quenched and hardened and the welded part rises in fatigue strength, but it is understood that a large difference in fatigue strength also arises due to the laser treatment conditions, that is, the differences in melted shapes.

Figure 5:
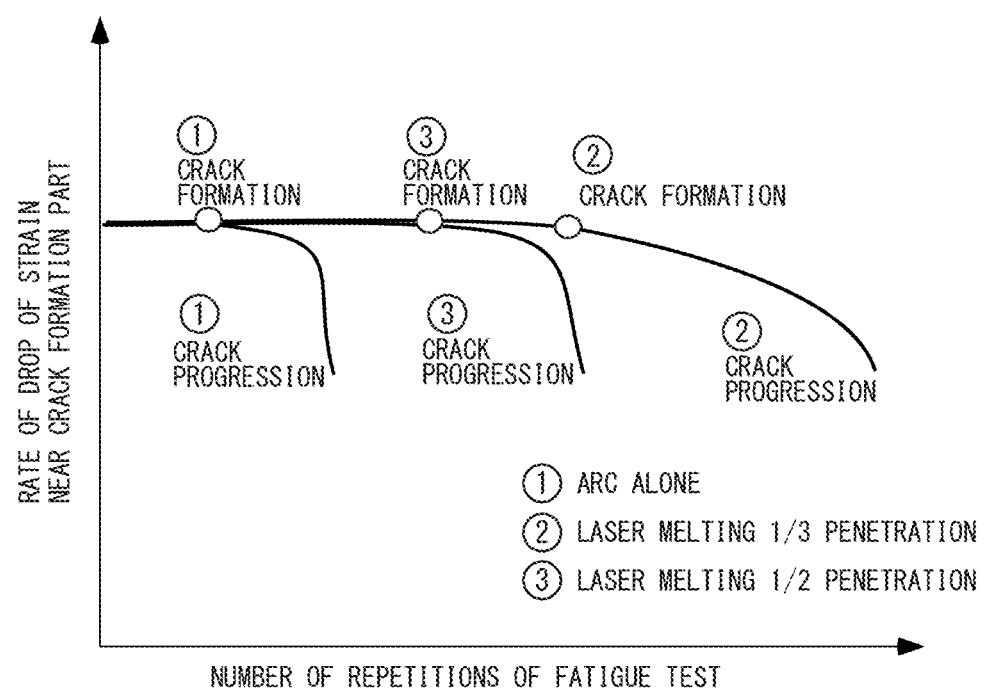
FIG. 5 is a graph showing a relationship among a number of repetitions of a fatigue test, a rate of change of strain, and progression of a crack.

Therefore, the inventors investigated the changes in strain history of the vicinities of crack formation parts with respect to the number of repetitions of fatigue tests for examples of Conditions A to C of Table 1. A strain gauge was attached to a position about 1 mm away from the toe part, and the periodic strain amplitude due to the repeated stress was measured. If a crack forms at the toe part, the strain amplitude measured by the strain gauge falls. The initial strain amplitudes at the Conditions A to C were all normalized to make them the same magnitudes. The relationship between the number of repetitions of the fatigue tests and the normalized strain (amplitude) is shown in FIG. 5. Note that, if classifying the Conditions A to C by the weld cross-sectional shapes, they correspond to the following melted shapes:

Condition A: case of performing only arc welding
Condition B: case of making depth of remelting by laser ½ or so of thickness
Condition C: case of making depth of remelting by laser ⅓ or so of thickness As will be understood from FIG. 5, compared with the case of the Condition A, in the case of the Condition B, a crack is formed later, but there is no difference in the speeds of propagation of the cracks. That is, with the Condition B, it is believed that the crack formation part became harder due to remelting by laser and the crack formation could be delayed, but along with the enlargement of the input heat region by the laser, the HAZ comprised of the coarse grain structure increased to a relatively broad range. For this reason, it is believed the crack progressed in the HAZ, there was no great difference in the crack propagation speed from the case of usual arc welding, and a sufficient improvement of the fatigue life did not result.

Further, it will be understood that compared with the Condition A, in the Condition C, a crack is formed later and the speed of propagation of the crack becomes slower. As the cause of the slower speed of crack propagation, it is believed that the path of progression of the crack was not the HAZ, but the base material comprised of the fine grain structure. On the other hand, this is believed because compared even with the Condition B where the hardness of the crack formation part is equal, in the case of the Condition C, the crack is formed later, so the input heat region shrinks along with the shrinkage of the region melted by laser and, as a result, the tensile residual stress falls.

Figure 6A:
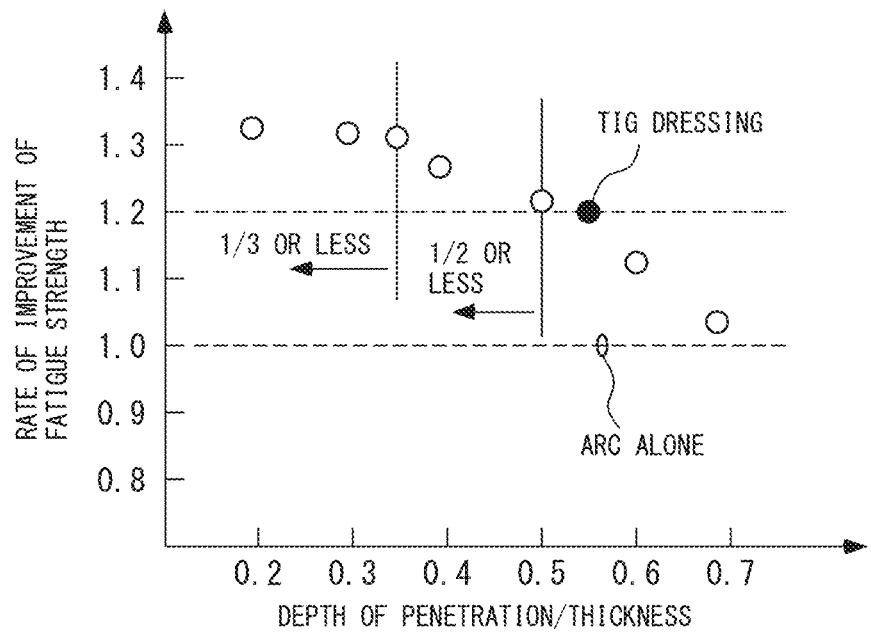
FIG. 6A is a graph experimentally finding a relationship of a depth of penetration of a remelted and solidified portion and a fatigue strength of a joint when preparing welded test pieces changed in depths of remelted and solidified portions.

For the purpose of finding the depth of the remelted and solidified portion able to improve the fatigue strength, welded test pieces changed in depths of remelted and solidified portions by a procedure similar to FIG. 4 were prepared and used to experimentally find the relationship between the depth of penetration of the remelted and solidified portion and the rate of improvement of the joint fatigue strength indexed to the fatigue strength with arc welding alone (that is, as arc welded) as 1.0. The results are shown in FIG. 6A. As shown in FIG. 6A, if the depth of the part where the crack is formed becomes greater than ½ t (½ thickness of sheet thickness t), the effect becomes the same as the case of performing TIG dressing. Further, if the depth of penetration of the remelted and solidified portion is shallow, the surface of that remelted and solidified portion becomes uneven, so the remelted depth is made ⅕ to ½ t, preferably ⅕ to ⅓ t.

Furthermore, to clarify the mechanism of improvement of fatigue strength in the present invention, the metal structure of the heat affected zone of the laser melted part of the test piece used for obtaining the test results of FIG. 6A and the vicinity thereof was examined.

Test pieces remelted by laser were examined for metal structure at a depth of 0.1 mm from the boundary portion of the remelted and solidified portion on the steel sheet surface and the heat affected zone of that remelted and solidified portion (below, referred to as the "remelted and solidified boundary portion") in the thickness direction of the steel sheet. Furthermore, the metal structures of test pieces in the states as arc welded and test pieces of TIG dressing were examined for metal structures other than at the remelted and solidified portions at a depth of 0.1 mm in the thickness direction starting from the boundary portion of the weld metal and heat affected zone at the steel sheet surface. The metal structure in a range of 500 μm×500 μm centered on the above position was analyzed by EBSD. The average effective crystal grain diameter of prior austenite was found from the crystal grain size when divided by a crystal orientation difference 15°. The prior austenite for which the effective crystal grain diameter is measured is not included in the remelted and solidified portion, but is included in the heat affected zone of the remelted and solidified portion due to the above laser treatment.

Figure 6B:
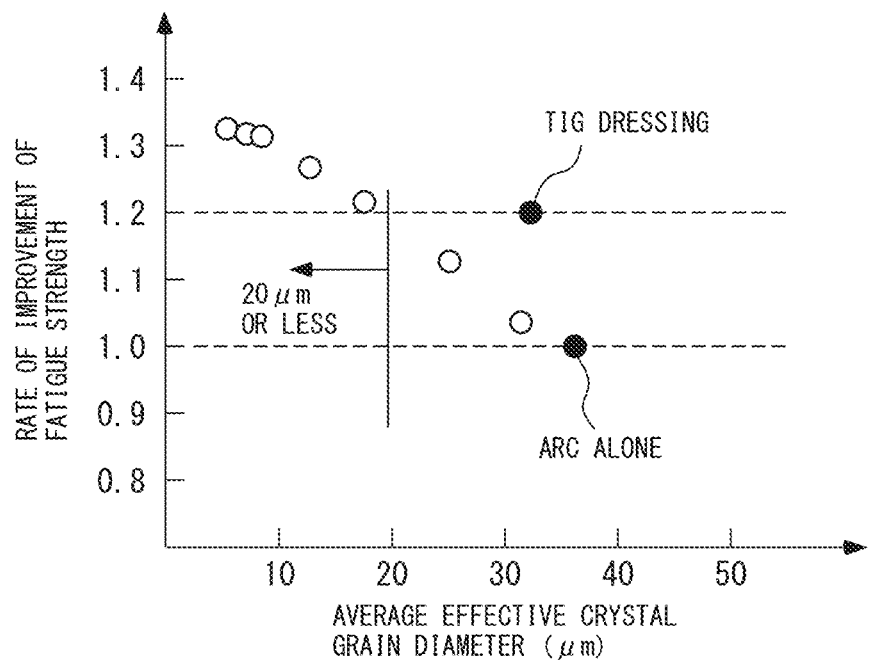
FIG. 6B is a graph showing a relationship of an average effective crystal grain diameter of prior austenite at a heat affected zone and a fatigue strength improvement rate obtained by examination of metal structures of weld toe portions or laser melted end parts of test pieces used for the test of FIG. 6A.

FIG. 6B shows the relationship between the average effective crystal grain diameter of prior austenite of the heat affected zone and the fatigue strength improvement rate. Furthermore, the fatigue strength of arc welding alone was made 1.0. In FIG. 6A, along with the drop in the depth of penetration, the fatigue strength increased, while in FIG. 6B, it will be understood that the fatigue strength increased due to a drop in the crystal grain size. The average effective crystal grain diameter of prior austenite with arc welding alone was 37 μm, while the average effective crystal grain diameter of prior austenite in the case of TIG dressing was 32 μm. As opposed to this, with laser treatment, it was confirmed that by making the average effective crystal grain diameter of prior austenite contained in the heat affected zone of the remelted and solidified portion by laser 20 μm or less, a rate of improvement of fatigue strength of the TIG dressing or more is obtained.

Note that, with TIG dressing, despite the crystal grain size being relatively large, a 1.2 times fatigue strength improvement rate is obtained, but it is believed this is due to the fact that the weld toe portion is remelted by a relatively large amount of heat, so the melted end part becomes smooth in shape and the stress concentration coefficient becomes a smaller value. That is, the conventional TIG dressing or plasma treatment technique is characterized by the action of smoothing the shape of the melted end part to reduce the concentration of stress at the weld toe portion where cracks are formed. As opposed to this, the present invention is characterized by the action of refining the metal structure of the part which a crack forms by laser treatment so as to improve the fatigue strength. In technical idea, this is different from the prior arts of TIG dressing etc.

Further, it is necessary to prevent enlargement of the HAZ due to the input heat of the laser. In addition, if the weld input heat increases, it becomes a cause of increase of the tensile residual stress of the melted end part and results in a faster progression of cracks, so it is preferable to increase the hardness at only the surface layer at the weld toe portion. Therefore, as shown by the graph of the "present invention" joint of FIG. 7, the laser treatment is preferably performed while adjusting the treatment conditions such as the laser treatment strength, laser treatment time, and treatment range so as to satisfy the following (i) and (ii). That is, (i) raising the hardness of the melted boundary newly caused by laser remelting at a position of 0.1 mm below surface of steel sheet in thickness direction to 1.2 times or more hardness of base material and (ii) making the hardness at a position of a depth of about ¼ of the steel sheet from the surface of the steel sheet in a direction vertically below the melted boundary at a position 0.1 mm below the surface of the steel sheet in the thickness direction 1.1 times or less the hardness of the base material.

If the hardness of the region of 0.1 mm thickness from the steel sheet surface is large, crack formation is suppressed, while if the hardness of the region of ¼ thickness from the steel sheet surface is small (that is, if the steel material is soft), progression of a crack is suppressed. As shown by the "conventional" joint graph of FIG. 7, in the hardness distribution of a conventional fillet arc welded joint, the hardness is not large in the region of 0.1 mm thickness and the hardness does not soften in the region of ¼ thickness. On the other hand, as shown by the graph of the "present invention" joint of FIG. 7, in the fillet arc welded joint of the present invention, the distribution of hardness in the thickness direction becomes a preferable distribution for suppression of a crack.

Figure 7:
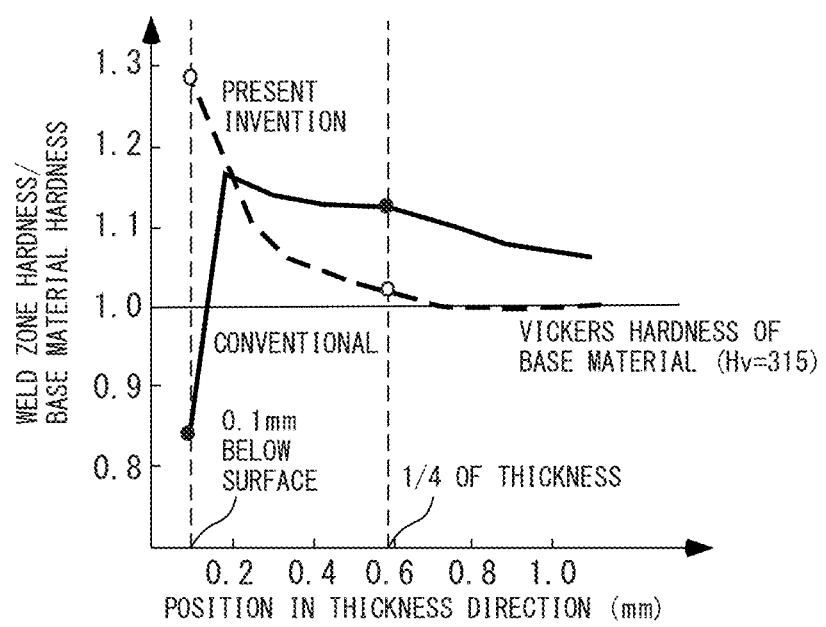
FIG. 7 is a graph showing the Vickers hardness in the thickness direction at the weld toe portion of a conventional fillet arc welded joint and a fillet arc welded joint of the present invention. Note that, the Vickers hardness is expressed as a ratio with respect to the Vickers hardness of the base material.
Figure 8:
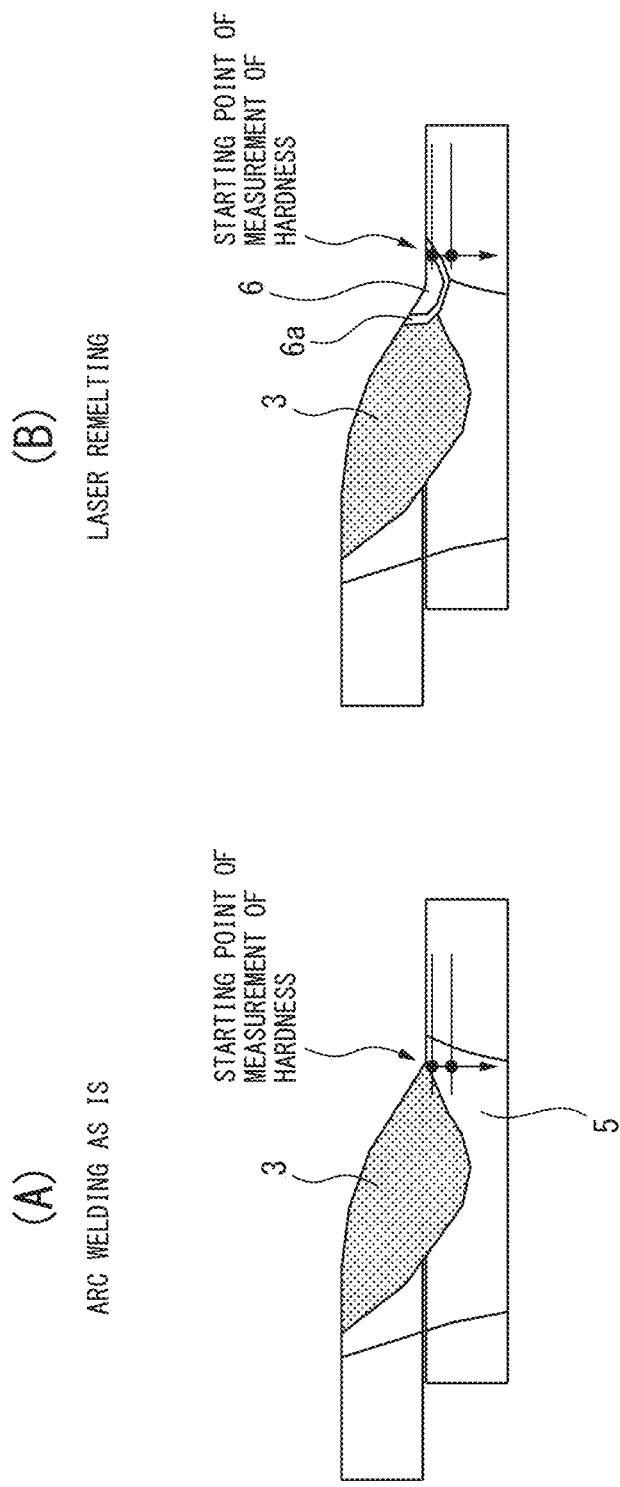
FIGS. 8A and 8B are enlarged cross-sectional views showing locations where the Vickers hardnesses shown in the graph of FIG. 7 are measured, wherein FIG. 8A corresponds to the graph of the "conventional" joint of FIG. 7 while FIG. 8B corresponds to the "present invention" joint of FIG. 7.

Furthermore, the locations of measurement of the Vickers hardness shown in the graphs of FIG. 7 are shown in FIGS. 8A and 8B. FIG. 8A is an enlarged cross-sectional view of an arc welded part not remelted by laser, while FIG. 8B is an enlarged cross-sectional view of a location arc welded based on the method for producing a fillet arc welded joint of the present invention. In FIG. 8A, the distribution of hardness in the thickness direction was measured along the arrow mark direction starting from the boundary portion of the weld metal 3 and heat affected zone 5 at 0.1 mm below the steel sheet surface. In FIG. 8B, the distribution of hardness in the thickness direction was measured along the arrow mark direction starting from the boundary portion of the laser remelted and solidified portion 6 and heat affected zone 6a at 0.1 mm below the steel sheet surface. However, the hardness of the base material was measured at a location sufficiently separated from the arrow mark lines of FIGS. 8A and 8B.

The present invention, as explained above, locally hardens the weld toe portion by laser. To raise this hardening effect, it is preferable to use a steel member having a composition with a Ceq value defined by formula (1) of 0.3 or more:

$$Ceq = C + Mn/6 + Si/24 + Ni/40 + Cr/5 + Mo/4 + V/14 \quad \text{formula (1)}$$

where, in formula (1), C, Mn, Si, Ni, Cr, Mo, and V show the contents of the elements (mass %).

Similarly, to raise the effect of local quenching of the weld toe portion by laser treatment, the welding material used preferably has a composition of a value of Ceg, defined by the above formula (1), of 0.3 or more.

Further, the region where a fatigue crack first is formed when a repeated load assumed to be applied to a welded structural member to which a load from the outside is directly applied is applied to that welded structural member may be formed with the remelted and solidified portion in the present invention. Alternatively, if the direction of the maximum main stress can be predicted, the weld location where this maximum main stress occurs may be formed with the remelted and solidified portion of the present invention. In this way, forming a remelted and solidified portion at least at one location where a high stress found in advance is applied is effective for improving the fatigue strength.

EXAMPLES

To clarify the relationship of the range of local quenching of the weld toe portion by laser and improvement of the fatigue strength of the welded part, test pieces were fabricated as follows, a laser beam was irradiated at the weld toe portion of the arc weld bead of the test piece, and the laser treated test piece was measured for Vickers hardness, fatigue strength, fatigue strength improvement rate, and average effective crystal grain diameter of prior austenite.

Table 2-1 shows the components (mass %) of the tested steel sheets. The steel sheet A is a 980 MPa class hot rolled steel sheet, while the steel sheet B is a 780 MPa class hot rolled steel sheet. Both have a Ceq of 0.3 or more. Further, the thickness of the steel sheet A is 2.3 mm, while the thickness of the steel sheet B is 2.9 mm.

TABLE 2-1

|  | C | Si | Mn | P | S | Cr | Cu | Mo | Nb | Ni | Al | V | Ti | Ceq | Thickness (mm) |
|---|---|---|---|---|---|---|---|---|---|---|---|---|---|---|---|
| Steel sheet A | 0.15 | 0.5 | 2.4 | 0.01 | 0.005 | 0.04 | 0.05 | 0.05 | 0.05 | 0.02 | 0.04 | 0.05 | 0.03 | 0.60 | 2.3 |
| Steel sheet B | 0.12 | 0.2 | 1.6 | 0.01 | 0.007 | 0.02 | 0.01 | 0.01 | 0.02 | 0.02 | 0.03 | 0.01 | 0.01 | 0.40 | 2.9 |

Table 2-2 shows the composition of welding wire. w1 is a welding wire for 490 MPa class steel sheet use, while w2 is a welding wire for 780 MPa class steel sheet use. The Ceg of w1 is less than 0.3, while the Ceq of w2 is 0.3 or more. The outside diameters of the wires are both 1.2 mm.

TABLE 2-2

| Symbol | C | Si | Mn | P | S | Cr | Cu | Mo | Nb | Ni | Al | V | Ti | Ceq |
|---|---|---|---|---|---|---|---|---|---|---|---|---|---|---|
| w1 | 0.07 | 0.7 | 1.1 | 0.01 | 0.005 | 0.01 | 0.2 | 0.01 | 0.05 | 0.01 | 0.002 | 0.001 | 0.01 | 0.29 |
| w2 | 0.07 | 0.5 | 1.3 | 0.01 | 0.008 | 0.80 | 0.3 | 0.20 | 0.01 | 2.3 | 0.002 | 0.01 | 0.01 | 0.58 |

These steel sheets and welding wires were used to prepare lap fillet welded joints by pulse MAG welding. The welding conditions were made a welding current of 190 A, an arc voltage of 24V, a welding speed of 0.8 m/min for a thickness 2.3 mm joint, and a welding speed of 0.6 m/min for a thickness 2.9 mm.

Next, the weld toe portions of the arc weld beads of the prepared test pieces were treated to melt the weld toe portions under the laser treatment conditions shown in Table 2-3. Condition I was made the case of no laser treatment, while Conditions II to VI were made use of a YAG laser processing apparatus with a laser output of 3 to 4 kW, a defocus length of +5 to +15 mm, and a speed of movement of 3 to 4 m/min. The lens of the laser processing apparatus had a focused size of 0.6 mm and a focal distance of 200 mm. As reference information, in the case of the ratio of the depth of penetration to steel sheet of a thickness of 2.3 mm, Condition III was the depth of penetration at about ½ of thickness and Conditions IV to VI were depths of penetration of about ⅓ of the thickness.

TABLE 2-3

| | Laser output (kW) | Defocus length (mm) | Speed of movement of laser (m/min) | Laser output/Speed of movement of laser (kJ/m) |
|---|---|---|---|---|
| I (Reference Example) | — | — | — | — |
| II | 3 | +5 | 3 | 60 |
| III | 3 | +10 | 3 | 60 |
| IV | 3 | +15 | 3 | 60 |
| V | 3 | +10 | 4 | 45 |
| VI | 4 | +15 | 4 | 60 |
| VII | 3 | +10 | 1 | 180 |

The steel sheets of Table 2-1, the welding wires of Table 2-2, and the laser treatment conditions of Table 2-3 were combined to prepare Bending Fatigue Test Piece Nos. 1 to 11 under the conditions of Table 3-1. These were measured for fatigue strength and fatigue strength improvement rate. Further, Fatigue Test Piece Nos. 1 to 11 were measured for Vickers hardness, fatigue strength, fatigue strength improvement rate, and average effective crystal grain diameter of prior austenite of the metal structure near the welded part.

[Measurement of Fatigue Strength]

The fatigue strength measurement test was conducted by complete pulsating tension using a Schenk fatigue machine. It was repeated up to 2,000,000 times. The fatigue test pieces were measured for locations of crack formation and 2,000,000 cycle fatigue strengths (stress amplitude). The results are shown in Table 3-2.

[Measurement of Fatigue Strength Improvement Rate]

Fatigue Test Piece No. 1 corresponded to a conventional lap fillet arc welded joint comprised of a combination of a 980 MPa class hot rolled steel sheet A and welding wire w1 for 490 MPa class steel sheet use. The fatigue strength was 170 MPa. Further, Fatigue Test Piece No. 7 corresponded to a conventional lap fillet arc welded joint comprised of a combination of a 780 MPa class hot rolled steel sheet B and welding wire w1 for 490 MPa class steel sheet use. The fatigue strength was 160 MPa. Fatigue Test Piece Nos. 2 to 6 the same in base material used as the Fatigue Test Piece No. 1 were calculated for fatigue strength improvement rates based on the fatigue strength of Fatigue Test Piece No. 1. Further, Fatigue Test Piece Nos. 8 to 11 the same in base material used as the Fatigue Test Piece No. 7 were calculated for fatigue strength improvement rates based on the fatigue strength of Fatigue Test Piece No. 7. From the results of the fatigue strength improvement rates of the fatigue test pieces calculated in this way, the results of improvement of the fatigue strength by the laser treatment of the toe were evaluated.

Note that, regarding the effect of improvement of the fatigue strength, there is no particularly defined standard, but in general, fatigue strength tests are considered to easily vary, so to obtain reliable results, an effect at least 20% over the conventional fatigue strength was deemed the invention.

[Measurement of Vickers Hardness]

Test pieces treated by laser under the Conditions II to VI were measured for Vickers hardness at the remelted and solidified boundary portion at a position of 0.1 mm below the steel sheet surface in the thickness direction. Furthermore, test pieces welded by Condition I or TIG dressing were measured for Vickers hardness at a depth of 0.1 mm depth in the thickness direction starting from the boundary portion of the weld metal and heat affected zone at the steel sheet surface. The measurement values of the test pieces are shown in "Vickers hardness at 0.1 mm depth from steel sheet surface (Hv-B)" of Table 3-2. Furthermore, the steel sheet surface hardness at a location sufficiently separated from the heat affected zone, weld zone, and remelted and solidified portion was measured. Furthermore, the "Vickers hardness of base material (Hv-A)" of Table 3-2 shows the measurement value of the surface hardness of a steel sheet before welding, welding by TIG dressing, and remelting by laser.

Further, test pieces treated by laser under the Conditions II to VI were measured for Vickers hardness at a depth of ¼ of the thickness of the steel sheet from the steel sheet surface in the direction vertically below the measurement point of the Vickers hardness (Hv-B). The measurement values of the test pieces are shown in the "Vickers hardness at t/4 depth from steel sheet surface (Hv-C)" of Table 3-2.

[Measurement of Average Effective Crystal Grain Diameter of Prior Austenite Near Welded Part]

Test pieces treated by laser under the Conditions II to VI were examined for metal structure at a depth of 0.1 mm from the remelted and solidified boundary portion on the steel sheet surface in the thickness direction of the steel sheet. Test pieces welded by Condition I or TIG dressing were examined for metal structure at a depth of 0.1 mm in the thickness direction starting from the boundary portion of the weld metal and heat affected zone at the steel sheet surface. The metal structure in a 500 µm×500 µm range centered at the above-mentioned position was analyzed by EBSD and the average effective crystal grain diameter of prior austenite was found from the crystal grain size when divided by a crystal orientation difference of 15°. The results of measurement are shown in the column of "Average effective crystal grain diameter of prior austenite (µm)" of Table 3-2.

TABLE 3-1

| Bending fatigue test piece no. | Type of base material | Type of welding wire | Laser treatment condition | Remelted and solidified portion depth (mm) | Ratio of remelted and solidified portion depth to base material thickness | Average effective crystal grain size of prior austenite (µm) | Remarks |
|---|---|---|---|---|---|---|---|
| 1 | A | w1 | I (None) | — | — | 41 | Conv. ex. |
| 2 | A | w1 | IV | 0.7 | 0.3 | 12 | Inv. ex. |
| 3 | A | w1 | VI | 0.5 | 0.22 | 8 | Inv. ex. |
| 4 | A | w1 | III | 1.1 | 0.48 | 18 | Inv. ex. |
| 5 | A | w2 | IV | 0.6 | 0.26 | 14 | Inv. ex. |
| 6 | A | w1 | II | 1.7 | 0.74 | 31 | Comp. ex. |
| 7 | B | w1 | I (none) | — | — | 38 | Conv. ex. |
| 8 | B | w2 | III | 1 | 0.34 | 16 | Inv. ex. |
| 9 | B | w1 | III | 0.9 | 0.31 | 14 | Inv. ex. |

TABLE 3-1-continued

| Bending fatigue test piece no. | Type of base material | Type of welding wire | Laser treatment condition | Remelted and solidified portion depth (mm) | Ratio of remelted and solidified portion depth to base material thickness | Average effective crystal grain size of prior austenite (μm) | Remarks |
|---|---|---|---|---|---|---|---|
| 10 | B | w1 | II | 1.5 | 0.65 | 23 | Comp. ex. |
| 11 | B | w2 | TIG dressing | 1.8 | 0.78 | 41 | Conv. ex. |
| 12 | A | w1 | VII | 1.7 | 0.74 | 34 | Comp. ex. |

TABLE 3-2

| Bending fatigue test piece no. | Vickers hardness of base material (Hv-A) | Vickers hardness at 0.1 mm depth from steel sheet surface (Hv-B) | (Hv-B)/(Hv-A) | Vickers hardness at t/4 depth from steel sheet surface (Hv-C) | (Hv-C)/(Hv-A) | Crack formation location | Fatigue strength (MPa) | Fatigue strength improvement rate | Remarks |
|---|---|---|---|---|---|---|---|---|---|
| 1 | 315 | 288 | 0.91 | 325 | 1.03 | Arc weld toe part | 170 | — | Conv. ex. |
| 2 | 315 | 389 | 1.23 | 313 | 0.99 | End part of remelted and solidified portion | 250 | 1.47 | Inv. ex. |
| 3 | 315 | 381 | 1.21 | 317 | 1.01 | End part of remelted and solidified portion | 265 | 1.56 | Inv. ex. |
| 4 | 315 | 381 | 1.21 | 316 | 1 | End part of remelted and solidified portion | 235 | 1.38 | Inv. ex. |
| 5 | 315 | 332 | 1.05 | 313 | 0.99 | End part of remelted and solidified portion | 220 | 1.29 | Inv. ex. |
| 6 | 315 | 383 | 1.22 | 367 | 1.17 | End part of remelted and solidified portion | 185 | 1.09 | Comp. ex. |
| 7 | 265 | 273 | 1.03 | 281 | 1.06 | Arc weld toe part | 160 | — | Conv. ex. |
| 8 | 265 | 321 | 1.21 | 265 | 1 | End part of remelted and solidified portion | 205 | 1.28 | Inv. ex. |
| 9 | 265 | 355 | 1.34 | 262 | 0.99 | End part of remelted and solidified portion | 220 | 1.38 | Inv. ex. |
| 10 | 265 | 355 | 1.34 | 331 | 1.25 | End part of remelted and solidified portion | 170 | 1.06 | Comp. ex. |
| 11 | 265 | 296 | 1.12 | 283 | 1.07 | End part of remelted and solidified portion | 180 | 1.13 | Conv. ex. |

[Invention Example Using 980 MPa Class Hot Rolled Steel Sheet A]

Fatigue Test Piece Nos. 2 and 3 satisfied the most suitable conditions of the present invention and gave the best results in fatigue strength or fatigue strength improvement rate. Fatigue Test Piece No. 4 was better than the conventional examples in both fatigue strength and fatigue strength improvement rate, but if the depth of remelting due to the laser exceeds ⅓ of the thickness, the penetration becomes too deep, so a crack tends to progress along the HAZ, so compared with Fatigue Test Piece Nos. 2 and 3, the fatigue strength and fatigue strength improvement rate were somewhat inferior. Further, Fatigue Test Piece No. 5 was also better than the conventional examples in both fatigue strength and fatigue strength improvement rate, but was fabricated using welding wire with a Ceq of less than 0.3, so the local quenching at a depth of 0.1 mm from the steel sheet surface was insufficient. Therefore, compared with the Fatigue Test Piece Nos. 2 and 3, the fatigue strength and fatigue strength improvement rate were somewhat inferior.

[Comparative Example Using 980 MPa Class Hot Rolled Steel Sheet A]

The Bending Fatigue Test Piece No. 6 was shortest in defocus length and had a remelted depth by laser reaching over ½ of the thickness, so the crack progressed inside the HAZ. As a result, the fatigue strength was not improved and a sufficient effect of improvement of the fatigue strength could not be obtained.

[Invention Example Using 780 MPa Class Hot Rolled Steel Sheet B]

The Fatigue Test Piece No. 8 was better in both fatigue strength and fatigue strength improvement rate than the conventional examples of Fatigue Test Piece Nos. 7 and 11 and the comparative example of Fatigue Test Piece No. 10. Furthermore, the Fatigue Test Piece No. 11 corresponded to a conventional lap fillet arc welded joint prepared using TIG dressing of the prior art. The penetration was deep enough so that the remelted depth by laser exceeded 70% of the thickness and the crack progressed inside the HAZ, so a sufficient effect of improvement of the fatigue strength could not be obtained. The Fatigue Test Piece No. 11 was large in depth of penetration, that is, large in input heat, so the HAZ became larger and the crack progressed only in the HAZ, so the fatigue strength was insufficient.

However, Fatigue Test Piece No. 8 was prepared using a welding wire with a Ceq of less than 0.3. The local quenching at a depth of 0.1 mm from the steel sheet surface results in a strength about 10% less than the Fatigue Test Piece No. 9. The Fatigue Test Piece No. 9 was prepared to give a remelted depth by laser of less than ⅓ of the thickness. In both the fatigue strength and fatigue strength improvement rate, better results were obtained than in the Fatigue Test Piece No. 8.

[Comparative Example Using 780 MPa Class Hot Rolled Steel Sheet B]

The Fatigue Test Piece No. 10 was shortest in defocus length, the remelted depth by laser reached over ½ of the thickness, the penetration was deep, and the crack progressed in the HAZ, so a sufficient effect of improvement of the fatigue strength could not be obtained.

INDUSTRIAL APPLICABILITY

The present invention has a high industrial applicability in the welding industry using high strength thin steel sheets.

REFERENCE SIGNS LIST 1. upper sheet
2. lower sheet
3. weld bead
4. crack
5. HAZ (heat affected zone)
6. laser remelted and solidified portion
6a. HAZ by laser melting

The invention claimed is:

1. A fillet arc welded joint formed by fillet arc welding at least two metal members,
    the fillet arc welded joint comprising a remelted and solidified portion obtained by irradiating by a laser a region including a weld toe portion of the fillet arc welding of at least one metal member of the metal members and a boundary of a heat affected zone caused by the fillet arc welding at the surface of the one metal member,
    the remelted and solidified portion being formed in a range from a surface of the one metal member to a depth of ½ or less of the thickness of the one metal member,
    an average effective crystal grain diameter of prior austenite at a heat affected zone from a remelted and solidified boundary portion to a depth of 0.1 mm in a thickness direction of the one metal member being 20 µm or less, the remelted and solidified boundary portion being a boundary of the remelted and solidified portion at a surface of the one metal member, wherein
    a depth of the remelted and solidified portion in a thickness direction of the one metal member is ⅕ or more of the thickness of the one metal member from the surface of the one metal member, and
    a hardness of a boundary portion between the remelted and solidified portion formed by the laser and the heat affected zone at a position of 0.1 mm below a steel sheet surface is 1.2 times or more of a hardness of a base material of the one metal member and a hardness of the one metal member from the surface of the steel sheet in a direction vertically under the boundary portion to a depth of ¼ of the thickness of the one metal member is 1.1 times or less of the hardness of the base material of the one metal member.

2. The fillet arc welded joint according to claim 1, wherein the remelted and solidified portion is formed in a range from the surface of the one metal member to a depth of ⅓ or less of the thickness of the one metal member.

3. The fillet arc welded joint according to claim 1, wherein the weld metal of the remelted and solidified portion has a Ceq value defined by the following formula (1) of 0.3 or more:

$$Ceq=C+Mn/6+Si/24+Ni/40+Cr/5+Mo/4+V/14 \quad \text{formula (1)}$$

where, in formula (1), C, Mn, Si, Ni, Cr, Mo, and V represent the contents of the elements (mass %), respectively.

4. The fillet arc welded joint according to claim 1, wherein the metal members are steel sheets of a thickness of 4.5 mm or less.

5. The fillet arc welded joint according to claim 1, wherein the remelted and solidified portion is formed at least at one location where a high stress estimated in advance is to be applied.

6. A method for producing a fillet arc welded joint comprising fillet arc welding at least two metal members,
    remelting by laser a region including a weld toe portion of the fillet arc welding of at least one metal member of the metal members and a boundary of the heat affected zone caused by the fillet arc welding of the surface of the one metal member, and
    forming a remelted and solidified portion from the surface of the one metal member down to a depth of ½ or less of the thickness of the one metal member, wherein
    a depth of said remelted and solidified portion from the surface of the one metal member is ⅕ or more of the thickness of the one metal member, comprising
    irradiating the laser so that a hardness at a boundary portion of a laser remelted and solidified portion at a position of 0.1 mm below a steel sheet surface in the thickness direction and the heat affected zone becomes 1.2 times or more of the hardness of a base material of the one metal member and a hardness at ¼ depth of the thickness of the one metal member from the steel sheet surface in a direction vertical down from the boundary portion becomes 1.1 times or less of the hardness of the base material of the one metal member.

7. The method for producing a fillet arc welded joint according to claim 6 wherein an average effective crystal grain diameter of prior austenite in the heat affected zone at a depth of 0.1 mm from the remelted and solidified boundary portion in a thickness direction of the one metal member is 20 µm or less.

8. The method for producing a fillet arc welded joint according to claim 6 wherein the remelted region is a range from the surface of the one metal member to a depth of ⅓ or less of the thickness of the one metal member.

9. The method for producing a fillet arc welded joint according to claim 6 wherein the remelted metal member has a Ceq value defined by the following formula (1) of 0.3 or more:

$$Ceq=C+Mn/6+Si/24+Ni/40+Cr/5+Mo/4+V/14 \quad \text{formula (1)}$$

where, in formula (1), C, Mn, Si, Ni, Cr, Mo, and V represent the contents of the elements (mass %), respectively.

10. The method for producing a fillet arc welded joint according to claim 6 wherein the metal members are steel sheets with a thickness of 4.5 mm or less.

11. The method for producing a fillet arc welded joint according to claim 6 further comprising remelting by laser at least one location where a high stress estimated in advance is to be applied.

12. The method for producing a fillet arc welded joint according to claim 6 wherein the laser has a ratio of laser output (kJ/sec) to speed of movement (m/min) of 45 to 80 (kJ/m).

* * * * *